United States Patent Office 3,419,584
Patented Dec. 31, 1968

3,419,584
POLYMERIC COMPOUNDS AND METHODS FOR THEIR PRODUCTION
Edward F. Elslager and David B. Capps, Ann Arbor, Mich., assignors to Parke, Davis & Company, Detroit, Mich., a corporation of Michigan
No Drawing. Filed Nov. 23, 1964, Ser. No. 413,311
7 Claims. (Cl. 260—397.6)

The present invention relates to new polymeric compounds and to methods for their production. More particularly, the invention relates to polymers of 4,4'-sulfonyldianiline compounds, the said polymers consisting essentially of the recurring structural unit represented by the general formula

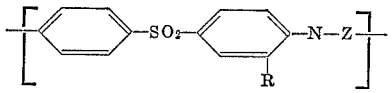

I where R is hydrogen or methyl and Z is

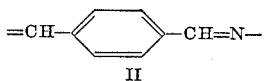

II

=CH—CH=CH—NH—

III or

=CH—CH=CH—NH=

.HA

IV where A represents one equivalent of a pharmaceutically-acceptable anion.

In accordance with the invention, polymeric compounds consisting essentially of the foregoing recurring structural units are produced by reacting a 4,4'-sulfonyldianiline compound, having the formula

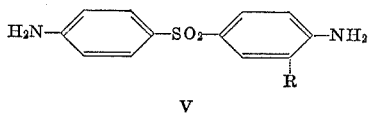

V with a dialdehyde compound, having the formula

OHC—Y—CHO

VI in a solvent medium; where R has the aforementioned significance and Y is 1,4-phenylene or methylene. The dialdehyde compound represented by Formula VI may be used directly as such in the reaction mixture or may be generated in situ by employing a suitable precursor in the presence of a strong acid. Some examples of suitable precursors of malondialdehyde, the dialdehyde compound where Y is methylene, that may be used are 1,1,3,3-tetraethoxypropane, propargyl aldehyde, and propargyl aldehyde diethyl acetal. Suitable solvents that may be used in the reaction are lower alkanols, such as methanol, ethanol, n-propanol, and isopropanol; glycols, such as ethylene glycol and propylene glycol; acetone; dimethylsulfoxide; and N,N-dimethylformamide. The lower alkanols are the preferred solvents. When the dialdehyde compound having Formula VI, wherein Y is 1,4-phenylene, is used directly in the reaction, the reaction is best carried out under essentially neutral conditions in the presence of only a catalytic amount of a strong acid. For the preparation of the polymeric compounds of the invention wherein Z is defined by Formulas III or IV, it is preferable to employ 1,1,3,3-tetraethoxypropane rather than malondialdehyde directly. In such a case, the reaction is best carried out in the presence of an equivalent amount, and even a slight excess, of a strong acid, and the polymeric compound is isolated in the form of an acid-addition salt. Suitable strong acids that may be used in the reaction are the mineral acids, such as hydrochloric acid, hydrobromic acid, sulfuric acid, and phosphoric acid; and strong organic acids, such as acetic acid, benzoic acid, benzenesulfonic acid, p-toluenesulfonic acid, and citric acid. Equivalent quantities of both the diamine and the dialdehyde reactant are normally used; an excess of either reactant is not harmful, however. The reaction is favored by temperatures in excess of 40° C., and is preferably carried out at a temperature between 60° and 150° C. The duration of the reaction is not critical and may be varied widely, from 30 minutes to 10 hours. At the conclusion of the reaction, the polymeric products normally precipitate from the solvent medium and are isolated by filtration. In those cases where the polymers remain in solution, they may be isolated by concentration of the solution or by addition of a suitable precipitant, such as ether, water, or aqueous acid, followed by filtration. Care should be taken, however, to avoid contacting the polymers wherein Z is defined by Formula II with strong acid, since these polymers are unstable under strongly acidic conditions.

The polymeric products of the invention wherein Z is defined by Formula IV are stable acid-addition salts that may be obtained directly from the process described above or by reaction of the polymers wherein Z is defined by Formula III with any of a variety of strong inorganic and organic acids that contain a pharmaceutically-acceptable anion. Some examples of pharmaceutically-acceptable anions represented by the symbol A in Formula IV above are the chloride, bromide, sulfate, phosphate, acetate, benzoate, p-toluenesulfonate, and benzenesulfonate, and citrate.

The polymeric free base may be obtained by neutralization of the acid-addition salt with a strong base, such as potassium hydroxide or sodium hydroxide.

The polymeric products of the invention are antimalarial and anti-leprosy agents that exhibit especially long duration of action. It is known that 4,4'-sulfonyldianiline is an effective antimalarial and anti-leprosy drug. To obtain the desired effects with this drug, however, frequent dosing, as often as once a week, is necessary. For large-scale malaria eradication programs or for mass leprosy treatment, it is impractical to administer a drug on such a frequent schedule. In contrast, the polymeric products of the present invention, while possessing the high activity of 4,4'-sulfonyldianiline, are non-irritating upon injection, and exhibit unusually long duration of action, thereby making it possible to extend the dosage interval from one week to as long as several months. The products of the invention can be formulated into suspensions that are pharmaceutically acceptable for intramuscular injection, using suspending vehicles such as 40% benzyl benzoate and 60% castor oil, or water containing emulsifying or dispersing agents.

The invention is illustrated by the following examples:

EXAMPLE 1

To a boiling solution of 12.4 g. of 4,4'-sulfonyldianiline in 400 ml. of isopropyl alcohol is added with stirring a solution of 6.7 g. of terephthalaldehyde in 300 ml. of boiling isopropyl alcohol. A small amount of p-toluenesulfonic acid is added, and the mixture is heated under reflux for 3 hours. The precipitated solid, which is polymeric N'-benzylidene - N - methylene-4,4'-sulfonyldianiline, is isolated by filtration and dried under reduced pressure at 65° C. for 18 hours; M.P. >340° C.

In a similar manner, from the reaction of 2-methyl-4,4'-sulfonyldianiline and terephthalaldehyde, there is obtained polymeric N'-benzylidene - N - methylene-2-methyl-4,4'-sulfonyldianiline; M.P. >310° C.

EXAMPLE 2

A mixture consisting of 24.8 g. of 4,4'-sulfonyldianiline, 24 ml. of 1,1,3,3-tetraethoxypropane, 8.6 ml. of concentrated hydrochloric acid, and 1000 ml. of methanol is stirred at room temperature for 15 minutes, and is then heated under reflux for 20 minutes. The precipitated orange solid, which is the hydrochloride salt of polymeric N-allylidene-4,4'-sulfonyldianiline, is isolated by filtration, washed with methanol, and dried; M.P. 258–262° C.

In a similar manner, from the reaction of 2-methyl-4,4' - sulfonyldianiline and 1,1,3,3 - tetraethoxypropane, there is obtained the hydrochloride salt of polymeric N-allylidene-2-methyl - 4,4' - sulfonyldianiline; M.P. 257–259° C.

EXAMPLE 3

By employing the procedure of Example 2 above, from the reaction of a mixture consisting of 24.8 g. of 4,4'-sulfonyldianiline, 17.2 g. of p-toluenesulfonic acid, 24 ml. of 1,1,3,3-tetraethoxypropane and 1000 ml. of methanol, there is obtained the p-toluenesulfonate salt of polymeric N-allylidene-4,4'-sulfonyldianiline.

We claim:
1. A pharmaceutically-acceptable polymeric compound composed of the recurring structural unit of the formula

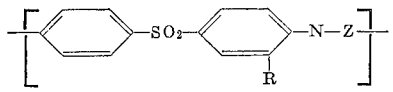

where R is a member of the class consisting of hydrogen and methyl, and Z is a member of the class consisting of a unit of the formula

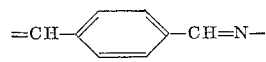

a unit of the formula

=CH—CH=CH—NH— and a unit of the formula

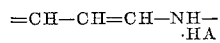

where A is one equivalent of a pharmaceutically-acceptable anion; whenever prepared or produced by reacting a 4,4-sulfonyldianiline compound having the formula

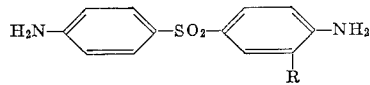

with a member of the class consisting of terephthalaldehyde, malondialdehyde, 1,1,3,3-tetraethoxypropane, propargyl aldehyde, and propargyl aldehyde diethyl acetal in a solvent medium in the presence of a strong acid; where R is defined as above.

2. A polymeric compound as defined in claim 1, wherein R is hydrogen and Z is a unit of the formula

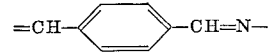

said polymer having a melting point of at least about 340° C.; whenever prepared or produced by reacting 4,4'-sulfonyldianiline witth terephthalaldehyde in a lower alkanol solvent in the presence of a catalytic amount of strong acid at a temperature between about 40° C. and about 150° C.

3. A polymeric compound as defined in claim 1, wherein R is methyl and Z is a unit of the formula

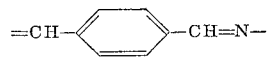

said polymer having a melting point of at least about 310° C.; whenever prepared or produced by reacting 2-methyl-4,4'-sulfonyldianiline with terephthalaldehyde in a lower alkanol solvent in the presence of a catalytic amount of strong acid at a temperature between about 40° C. and about 150° C.

4. A polymeric compound as defined in claim 1, wherein R is hydrogen and Z is a unit of the formula

=CH—CH=CH—NH—
·HA where A is defined as in claim 1; whenever prepared or produced by reacting 4,4'-sulfonyldianiline with 1,1,3,3-tetraethoxypropane in a lower alkanol solvent in the presence of a strong acid at a temperature between about 40° C. and about 150° C.

5. A polymeric compound as defined in claim 1, wherein R is hydrogen and Z is a unit of the formula =CH—CH=CH—NH—
·HCl whenever prepared or produced by reacting 4,4'-sulfonyldianiline with 1,1,3,3,-tetraethoxypropane in a lower alkanol solvent in the presence of hydrochloric acid at a temperature between about 40° C. and about 150° C.

6. A polymeric compound as defined in claim 1, wherein R is methyl and Z is a unit of the formula

=CH—CH=CH—NH—
·HA where A is defined as in claim 1; whenever prepared or produced by reacting 2-methyl-4,4'-sulfonyldianiline with 1,1,3,3,-tetraethoxypropane in a lower alkanol solvent in the presence of a strong acid at a temperature between about 40° C. and about 150° C.

7. A polymeric compound as defined in claim 1, wherein R is methyl and Z is a unit of the formula =CH—CH=CH—NH—
·HCl whenever prepared or produced by reacting 4,4'-sulfonyldianiline with 1,1,3,3,-tetraethoxypropane in a lower alkanol solvent in the presence of hydrochloric acid at a temperature between about 40° C. and about 150° C.

References Cited

UNITED STATES PATENTS

| | | | |
|---|---|---|---|
| 2,376,430 | 5/1945 | Hartmann et al. | 260—397.6 |
| 3,073,851 | 1/1963 | Steiger et al. | 260—397.6 |

OTHER REFERENCES

Chemical Abstracts, vol. 57, col. 16378–79 (1962), abstract of article by Yanovskaya et al.

Korshak et al.: Academy of Sciences, U.S.S.R. Bulletin, Division of Chemical Sciences (1955), pp. 841–44.

Sinnhuber et al.: Food Technology, vol. 12, pp. 9–12, January, 1958.

Saslaw et al.: J. Org. Chem., vol. 22, pp. 843–44 (1952).

Fuson: Reactions of Organic Compounds, John Wiley and Sons, Inc., New York, 1962, p. 163.

HENRY R. JILES, *Primary Examiner.*

U.S. Cl. X.R.

167—51.5, 65; 260—72.5